United States Patent [19]
Tworzydlo

[11] Patent Number: 5,946,764
[45] Date of Patent: Sep. 7, 1999

[54] WIPER WITH TILIABLE SUBSTRUCTURE AND AIRFLOW DEFLECTORS

[76] Inventor: Wlodzimierz Woytek Tworzydlo, 2412 Springwagon La., Austin, Tex. 78728

[21] Appl. No.: 08/869,906

[22] Filed: Jun. 5, 1997

[51] Int. Cl.$^6$ .................................. B60S 1/38; B60S 1/40
[52] U.S. Cl. .................................. 15/250.201; 15/250.46; 15/250.32; 15/250.33
[58] Field of Search ........................... 15/250.32, 250.33, 15/250.46, 250.201, 250.351, 250.44, 250.48

[56] References Cited

U.S. PATENT DOCUMENTS

| | | | |
|---|---|---|---|
| 2,160,736 | 5/1939 | Horton . | |
| 2,794,203 | 6/1957 | Oishei | 15/250.201 |
| 3,037,233 | 6/1962 | Peras et al. | 15/250.201 |
| 3,234,578 | 2/1966 | Golub et al. | 15/250.201 |
| 3,405,421 | 10/1968 | Tomlin | 15/250.33 |
| 3,431,579 | 3/1969 | Krohm et al. | 15/250.33 |
| 3,453,680 | 7/1969 | Charlton | 15/250.33 |
| 3,751,754 | 8/1973 | Quinlan . | |
| 4,169,298 | 10/1979 | Smith . | |
| 4,287,634 | 9/1981 | Speth . | |
| 4,766,636 | 8/1988 | Shinpo | 15/250.201 |
| 5,206,969 | 5/1993 | Patterson . | |
| 5,325,563 | 7/1994 | Cayan . | |
| 5,383,249 | 1/1995 | Yang | 15/250.201 |
| 5,430,908 | 7/1995 | Deng . | |
| 5,437,077 | 8/1995 | O'Donnell . | |
| 5,497,528 | 3/1996 | Wu | 15/250.46 |
| 5,519,913 | 5/1996 | Schedule | 15/250.46 |
| 5,666,687 | 9/1997 | Charng | 15/250.46 |

FOREIGN PATENT DOCUMENTS

| | | | |
|---|---|---|---|
| 1023024 | 12/1952 | France | 15/250.33 |
| 2594083 | 8/1987 | France | 15/250.201 |
| 60-92136 | 5/1985 | Japan | 15/250.32 |

*Primary Examiner*—Gary K. Graham

[57] ABSTRACT

A windshield wiper blade assembly equipped with a combination of tilting secondary yokes (38) and airflow deflectors (44) articulated thereon, to provide smooth operation and wind lift resistance at a broad range of driving speeds. Wiper blade assembly (24) is mounted on a distal end of a wiper arm (22) and is driven in a reciprocating motion across a windshield (20). The wiper blade assembly has a wiping element (46) attached to a supporting structure that includes a main yoke (34), two secondary yokes (38) and possibly tertiary yokes (40). Dual-pivot hinges (42) are introduced between main yoke (34) and secondary yokes (36) of the wiper blade. As wiper blade (24) sweeps across windshield (20), the friction force causes limited tilting or canting of the tilting substructure, which includes secondary yokes (38), tertiary yokes (40) and wiping element (46). The tilting produces desirable chatter-resistant angle of attack and reduces squeak. The tilt angle is generally different for each sweep direction. Airflow deflectors (44) are attached to the tilting substructure, generally on the opposite side of the longitudinal pivot axis than wiping element (46). The airflow deflectors produce aerodynamic forces that counterbalance the airflow pressure on wiping element (46), thereby preventing the wiper from being flipped to the undesirable angle of attack by the airflow. Thus, chatter and squeak is prevented at a broad range of driving speeds. Additionally, the airflow deflectors prevent wiper blade liftoff. In an alternative embodiment, one longitudinal pivot hinge (200) is introduced at the connection between main yoke (34) and wiper arm (22). The longitudinal pivot hinge is combined with main yoke airflow deflector (204) and secondary yoke airflow deflectors (206), to accomplish the same results as the primary embodiment.

15 Claims, 6 Drawing Sheets

WIPER WITH TILIABLE SUBSTRUCTURE AND AIRFLOW DEFLECTORS

BACKGROUND—FIELD OF INVENTION

The present invention refers generally to windshield wipers, and in particular to a windshield wiper assembly hinged longitudinally of cleaning element and equipped with airflow deflectors.

BACKGROUND—DESCRIPTION OF PRIOR ART

A standard windshield wiper is composed of a wiper arm articulated on a wiper driving shaft and a wiper blade assembly pivotally attached at the distal end of the arm. In most typical embodiments the wiper retainer does not allow a great deal of relative motion between the arm and the wiper blade. Thus, the windshield wiper typically maintains a constant angle of attack with respect to the windshield, except for the changes of the angle of attack due to curvature of the windshield. As a result, the wiper blade often sweeps the windshield at a negative angle of attack, which causes chatter, squeak, poor cleaning and excessive wear. Here the angle of attack is defined as positive when the wiping element is following behind the top portion of the wiper blade during the sweeping motion.

To counteract wiper chatter and excessive wear, various inventions have been proposed to effect appropriate tilting or canting of the wiper blade and maintain a positive angle of attack. The relevant solutions fall into two groups: (a) systems which force the change of the angle of attack by means of some driving mechanism, and (b) wiper blades with longitudinal hinge or hinges, where the blade tilting is effected by the friction between the wiping element and the windshield. The solutions in the first group, such as the U.S. Pat. No. 5,430,908 to Deng (1995), are usually mechanically very complex and require dedicated driving mechanisms. The solutions in the latter group include the U.S. Pat. No. 2,160,736 to Horton (1939), U.S. Pat. No. 3,751,754 to Quinlan (1973), U.S. Pat. No. 4,169,298 to Smith (1979), U.S. Pat. No. 4,287,634 to Speth (1981), U.S. Pat. No. 5,325,563 to Cayan (1994) or U.S. Pat. No. 5,437,077 to O'Donnell (1995). These solutions are mechanically simpler, but they suffer from serious disadvantages that prevent them from effective practical use:

a) They fail to provide smooth operation at higher airflow velocity usually accompanying highway driving speeds. This happens during the downwind sweep of the wiper blade (i.e., in the direction of typical airflow on the windshield). The air pressure on the blade assembly may cause it to flip to a non-desirable tilted position, which is opposite to the tilt position intended. In this non-desirable position the wiping element is pushed at a negative angle of attack. This causes violent chatter, squeak and very poor cleaning efficiency.

b) Due to having the same tilting angle in both sweep directions, previous art may fail to maintain optimal attack angle of the cleaning element in both sweeping directions. This is because the airflow pressure on the cleaning element tends to increase its angle of attack during the upwind sweep, and reduce it during the downwind sweep. This is explained in greater detail in the specifications of this invention. Although the U.S. Pat. No. 4,169,298 to Smith (1979) indicates possibility of different values of the tilting angle for each side of the wiper blade, it does not provide recommendations as to the preferred arrangement. Moreover, it accomplishes it through a cumbersome set of protruding flaps, which is not optimal.

c) Because of lack of damping in the pivot hinge, the previous art solutions may cause noisy clicks when the wiper blade flips from one tilted position to another.

The second problem adversely affecting the performance of windshield wipers is lift force generated by the airflow acting on the blade. To counteract this tendency, many air-deflecting devices have been proposed. They generally consist of an airfoil-shaped member attached to the wiper arm or to the wiper blade superstructure or to the cleaning element. In almost all cases, the airfoils serve only one purpose—preventing blade liftoff by generating downward (towards the windshield) force on the blade assembly. In the U.S. Pat. No. 5,206,969 to Patterson et al. (1993) the airfoil also serves to suppress wiper chatter by means of high mass that is supposed to dampen the energy of the wiper blade oscillations.

SUMMARY

According to the present invention the wiper blade assembly, or its major substructure supporting the cleaning element, is tiltable about an axis that is approximately parallel to the longitudinal axis of the wiper blade. The tilting or canting action maintains a desirable positive angle of attack of the cleaning element. One or more airflow deflectors are articulated on the tilting substructure. These deflectors balance off the spurious tilting moment caused by airflow pressure on the wiping element and thus help maintain desirable positive angle of attack at all driving speeds. The airflow deflectors also prevent blade liftoff. The result of this invention is a wiper blade assembly resistant to chatter, squeak and liftoff at a wide range of airflow velocities.

OBJECTS AND ADVANTAGES

Accordingly, several objects and advantages of my invention are:

a) to provide smooth operation of the windshield wipers, reduced noise and superior cleaning across a wide range of airflow velocities, b) to maintain close to an optimal attack angle for each direction of the reciprocating wiping motion, and c) to utilize airflow deflectors not only to prevent blade liftoff, but also to help maintain correct angle of attack of the wiper blade and prevent spurious changes of the angle of attack caused by airflow pressure at high driving speeds.

It is also an object of this invention to accomplish these benefits through a system that is mechanically simple and applicable to the existing windshield wiper mounting and drive systems. Further objects and advantages of my invention will become apparent from a consideration of the drawings and ensuing description.

DESCRIPTION OF DRAWINGS

In the drawings, closely related figures have the same number but different alphabetic suffixes.

LIST OF REFERENCE NUMERALS

| | |
|---|---|
| 20 windshield | 80 bridge-type airflow deflector |
| 22 wiper arm | 82 airfoil attachment hinge |
| 24 wiper blade assembly | 84 hinge bracket |
| 26 wiper drive shaft | 86 airfoil retainer shaft |
| 28 prevailing airflow direction | 90 flexible bushing |
| 30 downwind sweep direction | 92 rocker shaft |
| 32 upwind sweep direction | 94 protruding plug |
| 34 main (primary) yoke | 96 plug aperture |
| 36 wiper blade retainer | 97 sidewall aperture |
| 38 secondary yoke | 98 bushing aperture |
| 40 tertiary yoke | 200 longitudinal pivot hinge |
| 42 dual-pivot hinge | 201 wiper blade pivot retainer |
| 44 airflow deflector (airfoil) | 202 retainer sidewall |
| 46 wiping element | 203 retainer axle |
| 48 air deflector attachment claws | 204 main yoke airflow deflector |
| 52 resilient element | 206 secondary yoke airflow deflector |
| 54 pivot hinge retaining claw | 208 longitudinal pivot connector |
| 56 resilient element notch | 210 pivot connector aperture |
| 58 secondary yoke notch | 212 resilient flap |
| 60 resilient element flange | 213 flap aperture |
| 62 fulcrum ridge | 214 longitudinal pivot axle |
| 64 resilient element sidewall | 216 pivot connector flange |
| 66 resilient element dorsal wall | 218 bumper ridge |
| | 222 sidewall notch |

DESCRIPTION OF THE INVENTION

While this invention is susceptible to embodiment in many different forms, several preferred embodiments are described herein, with the understanding that the present disclosure is to be considered an exemplification of the principles of the invention and is not intended to limit the invention to the embodiments illustrated.

Figure 1:
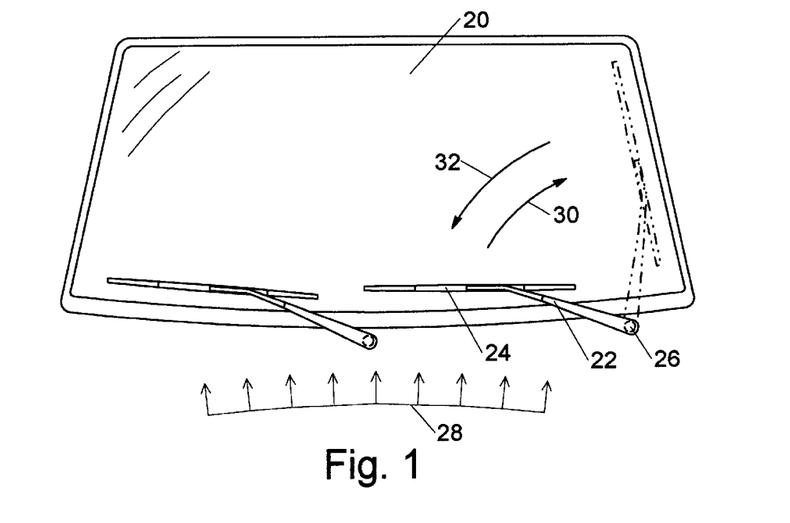
FIG. 1 shows a top-plan view of a typical windshield with windshield wipers.

FIG. 1 shows a typical windshield wiping system to which this invention pertains. A windshield 20 is swept by one or more wiper blades 24. Wiper blade or wiper blade assembly 24 is articulated on a wiper arm 22 which is propelled into a reciprocating sweeping motion across windshield 20 by a wiper drive shaft 26. The reciprocating motion begins with a sweep in a downwind sweep direction 30, during which wiper blade 24 moves generally in agreement with a prevailing airflow direction 28 on the windshield. Then, wiper blade 24 reverses and moves in an upwind sweep direction 32, which is generally opposite to airflow direction 28.
Description of Main Embodiment—FIGS. 2 to 7

Figure 2:
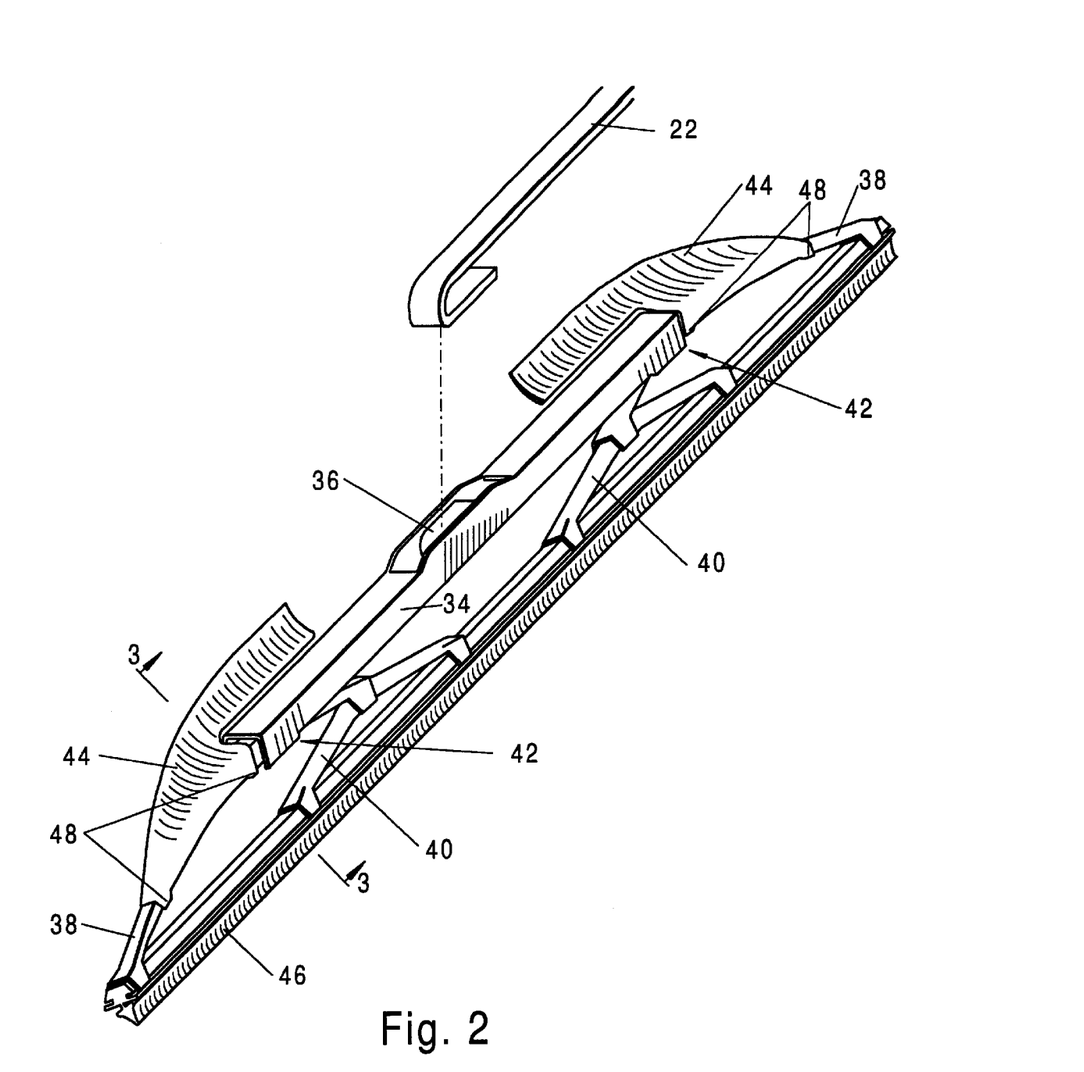
FIG. 2 shows an isometric view of the main embodiment of the windshield wiper according to the present
Figures 3A, 3B:
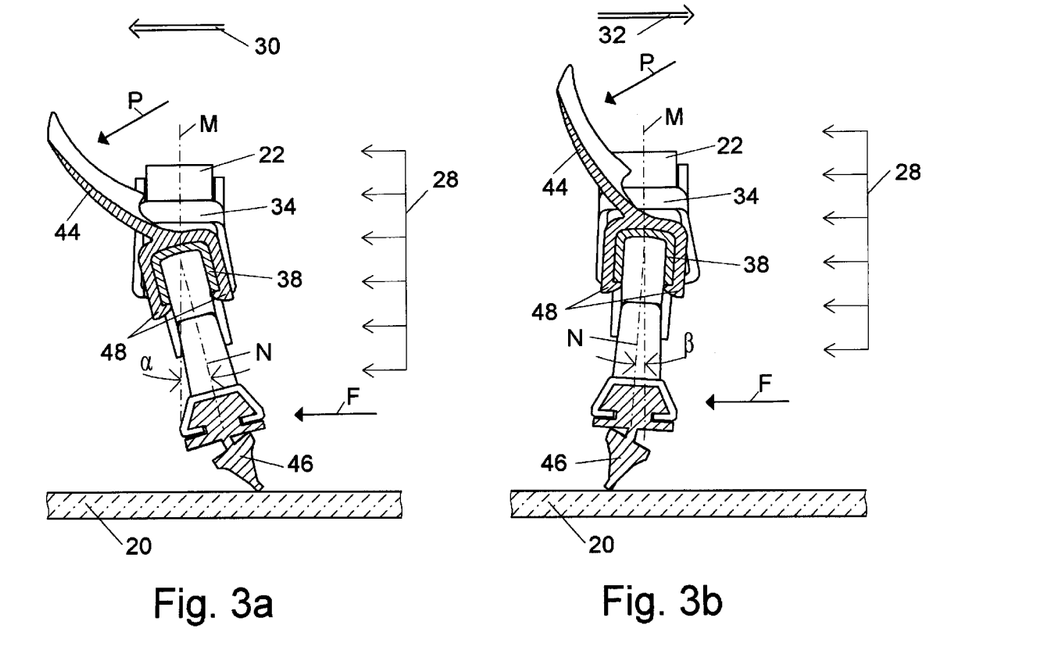
FIGS. 3a and 3b show cross-sectional views of the main embodiment and illustrate its mode of operation.

FIGS. 2 and 3 show the main embodiment of the wiper blade assembly according to the present invention. In particular, FIG. 2 shows an isometric view of the main embodiment and FIGS. 3a and 3b show cross-sectional view indicated by section lines 3—3 in FIG. 2. The wiper blade assembly consists of a main yoke or bridge 34 articulated onto a windshield wiper arm 22 by means of a wiper blade attachment or retainer 36. The particular retainer solution used for connecting main yoke 34 to arm 22 is not of concern in this embodiment. On both distal ends of main yoke 34 two secondary yokes 38 are articulated by means of dual-pivot hinges 42. Each hinge 42 allows for two types of motion. The first type is the typical rocking motion of secondary yokes 38 within the main plane of the wiper blade assembly, to accommodate varying windshield curvatures. According to the present invention, hinges 42 allow for limited tilting or canting of secondary yokes 38 about a longitudinal pivot axis, which is generally parallel to main yoke 34. Details of hinges 42 and their operation will be described later.

In the typical configuration of a windshield wiper shown in FIG. 2, tertiary yokes 40 are articulated on the distal ends of secondary yokes 38. The outer ends of secondary yokes 38 and both ends of tertiary yokes 40 support a wiping element 46. In general, more than two tertiary yokes may be present or none at all. The main yoke, secondary yokes, tertiary yokes and relevant attachments constitute a supporting structure of wiping element 46. On the dorsal portions of secondary yokes 38 two airflow deflectors or airfoils 44 are secured by air deflector attachment claws 48. The claws engage the edges of secondary yokes 38, as shown in FIG. 3, and thus secure airflow deflectors 44 to secondary yokes 38. Alternatively, adhesive is used or airflow deflectors 44 are integral with secondary yokes 38 (for example by being formed from the same piece of material). The airflow deflectors are located generally on the opposite side of hinges 42 than wiping element 46. Moreover, they are shaped in an airfoil shape and slanted towards a leeward side of wiper blade assembly 24, as shown in FIGS. 3a and 3b. Secondary yokes 38, tertiary yokes 40, wiping element 46 and airflow deflectors 44 are the constituents of a tilting substructure of wiper blade 24 with a middle plane N. Primary yoke 34 and wiper blade retainer 36 constitute a non-tilting substructure with a main plane M.

The operation of the main embodiment of the present invention is illustrated in FIGS. 1 and 3. As wiper arm 22 shown in FIG. 1 reciprocates in downwind and upwind sweep directions 30 and 32, respectively, wiper blade 24 is drawn across the windshield. The friction force between windshield 20 and wiping element 46 causes the tilting substructure of wiper blade 24 to tilt according to the direction of sweep. The tilt angle is limited by hinge 42 and is generally different for each direction of sweep. FIG. 3a shows a cross-sectional view of wiper blade assembly 24 as it is drawn across windshield 20 in the downwind sweep direction 30. Secondary yokes 38 and the entire tilting substructure supported by them are tilted relative to main yoke 34 in such a way that the tilt angle of middle plane N of the tilting substructure relative to main plane M of main yoke 34 is equal $\alpha$. The preferred limiting value of the tilt angle $\alpha$ is in the range of 10 to 20 degrees. This tilted position corresponds to positive angle of attack and causes resistance to chatter and squeak during the downwind sweeping motion.

When the vehicle moves, airflow is generated over the windshield and is generally aligned with prevailing airflow direction 28. The air pressure creates a force F acting on the components of the tilting substructure, including wiping element 46, tertiary yokes 40 and secondary yokes 38. In the previous art, such as U.S. Pat. No. 2,160,736 to Horton (1939), U.S. Pat. No. 3,751,754 to Quinlan (1973), U.S. Pat. No. 4,169,298 to Smith (1979), U.S. Pat. No. 4,287,634 to Speth (1981), U.S. Pat. No. 5,325,563 to Cayan (1994) or U.S. Pat. No. 5,437,077 to O'Donnell (1995), the aerodynamic force F can overcome the friction between wiping element 46 and windshield 20, and cause flip of the tilting substructure into an undesirable tilt position corresponding to negative angle of attack. This promotes wiper blade chatter. In the present wiper blade assembly, the airflow pressure on airflow deflectors 44 creates an aerodynamic force P that balances off the undesirable tilting moment caused by force F. This is possible because airflow deflectors 44 are articulated on secondary yokes 38 (which are a part of the tilting substructure) and are located generally on the opposite side of hinges 42 than wiping element 46. To best accomplish this objective, the size of the airflow deflectors need to be properly adjusted according to the specific dimensions of the wiper blade assembly. Typically, the length of each airflow deflector 44 is between one-fifth and one-third of the total length of wiping element 46, and its maximum width is between one to two times the total height of wiping element 46, as measured in the direction normal to the windshield (including any supporting rails or backing strips). Since the aerodynamic force P is directed generally towards windshield 20, the airflow deflectors also contribute to prevention of blade liftoff.

FIG. 3b shows a cross-sectional view of wiper blade assembly 24 as it is drawn across windshield 20 in the upwind sweep direction 32. Middle plane N of the tilting substructure of wiper blade assembly 24 is tilted relative to main plane M of main yoke 34 by a tilt angle $\beta$. The angle $\beta$ is essentially smaller than said angle $\alpha$—the preferred limiting value of the tilt angle $\beta$ is in the range of 0 to 5 degrees. This is for the following reasons: (a) the airflow pressure acting on wiping element 46 tends to increase its angle of attack when wiper blade 24 sweeps in upwind direction 32 and (b) the wiping elements usually develop semi-permanent deformation corresponding to the position shown if FIG. 3b (due to remaining in this position when not in use). Thus, the small value of the tilt angle $\beta$ helps to maintain optimal attack angle of wiping element 46 and chatter-resistant operation of the windshield wiper.

Figures 4A, 4B, 4C, 4D:
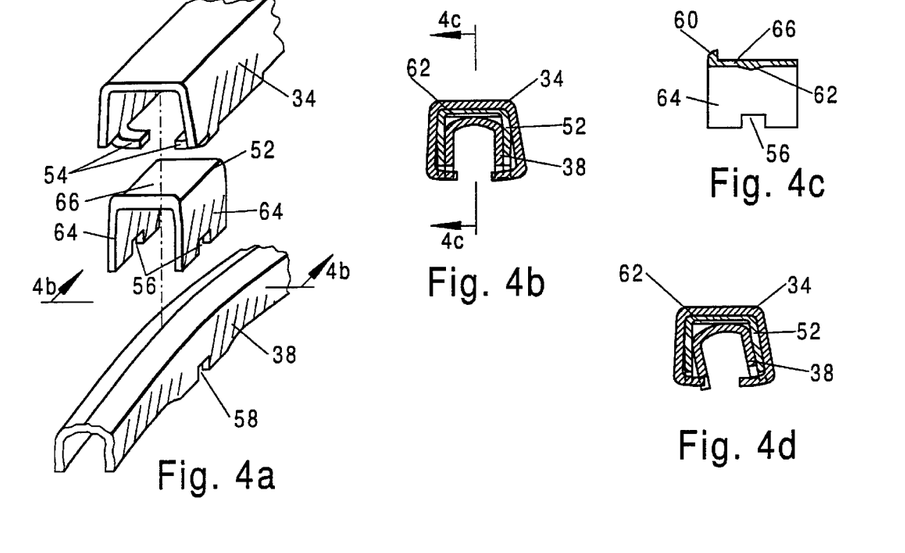
FIGS. 4a, 4b, 4c and 4d show the details of the main embodiment of a dual-pivot hinge that allows for wiper blade tilting.

FIGS. 4a, 4b and 4c show the main embodiment of dual-pivot hinge 42. FIG. 4a shows an exploded view of the hinge assembly and FIG. 4b a cross-sectional view of the hinge indicated by section lines 4b—4b in FIG. 4a. The dual-pivot hinge connects distal end of main yoke 34 with secondary yoke 38. The sidewalls of main yoke 34 at its distal end are inclined at predetermined angles, as shown in FIG. 4b. A resilient element 52 is fit between distal end of main yoke 34 and the central portion of secondary yoke 38. This element is preferably made of plastic-type resilient material that allows resilient element sidewalls 64 to flex outwardly. Pivot hinge retaining claws or flaps 54 extend from the sidewalls of main yoke 34 and fit into resilient element notches 56 and into secondary yoke notches 58. FIG. 4c shows a sectional view of resilient element 52 indicated by section lines 4c—4c in FIG. 4b. The resilient elements flange 60 engages against the distal end of main yoke 34. On the underside of resilient element dorsal wall 66 a fulcrum ridge 62 is protruding to support the dorsal part of secondary yoke 38.

The operation of the main embodiment of dual-pivot hinge is illustrated in FIGS. 4a to 4d. The dual-pivot hinge 42 allows for two types of motion between main yoke 34 and secondary yokes 38. First, a rocking motion within the main plane of wiper blade assembly 24 is provided by allowing the dorsal portion of secondary yoke 38 to swivel on fulcrum ridge 62. This allows the wiper blade to accommodate varying curvature of the windshield. The second type of motion allowed by the dual-pivot hinge is a tilting motion of secondary yokes 38. This is illustrated in FIGS. 4b and 4d. FIG. 4b shows a sectional view of the hinge in a basic non-tilted position, and FIG. 4d shows the same view in a tilted position corresponding to downwind sweep direction 30. The tilting motion of secondary yoke 38 is limited by inclined sidewalls of the distal end of main yoke 34 and by claws 54. This is shown in FIG. 4d. The sidewall inclination and claws 54 are so adjusted that the resulting tilting angles of secondary yokes 38 and the tilting substructure supported thereby correspond to angles $\alpha$ and $\beta$ shown in FIGS. 3a and 3b, respectively. As the secondary yoke tilts, one of resilient element sidewalls 64 flexes and thus provides some residual resistance to tilting. This resistance contributes to damping of noise as the secondary yoke flips between the opposite tilted positions.

The present dual-pivot hinge is mechanically simpler and quieter than previous art of similar functionality shown in U.S. Pat. No. 4,287,634 to Speth (1981) and U.S. Pat. No. 5,325,563 to Cayan (1994). Moreover, it features different tilting angles $\alpha$ and $\beta$ for each sweep direction 30 and 32, respectively, which essentially improves chatter resistance of the wiper blade, especially at higher driving speeds.

Figure 5A:
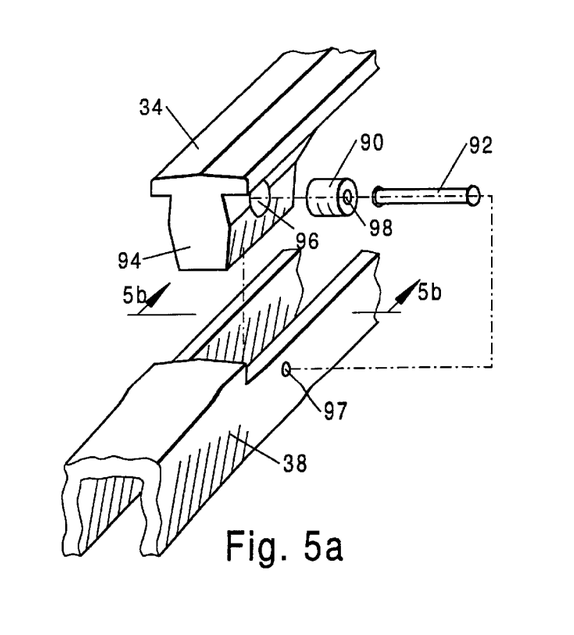
FIGS. 5a and 5b show the details of a second embodiment of the dual-pivot hinge.
Figure 5B:
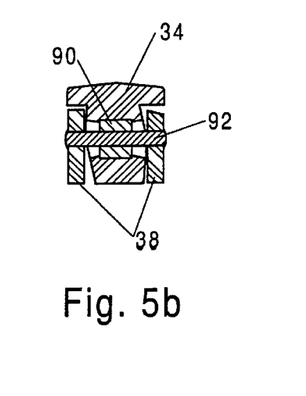

A second embodiment of dual-pivot hinge 42 is shown in FIGS. 5a and 5b. FIG. 5a shows an exploded isometric view of the hinge and FIG. 5b shows a sectional view corresponding to section lines 5b—5b in FIG. 5a. Main yoke 34 at its distal ends has a protruding plug 94, which extends downward and fits between sidewalls of secondary yoke 38. A flexible bushing 90 is fit centrally inside plug aperture 96, which extends through plug 94. The bushing is made of flexible material, such as rubber or other polymer. The length of the bushing is smaller than the length of aperture 96. The radius of aperture 96 on both sides of bushing 90 is slightly smaller than the outer radius of the bushing, thus forming internal flanges. A rocker shaft 92 extends through sidewall apertures 97 in sidewalls of secondary yoke 38 and through a bushing aperture 98 in bushing 90. The sides of protruding plug 94 are beveled at predetermined angles, as shown in FIG. 5b.

The second embodiment of dual-pivot hinge 42 allows for the same types of motion between main yoke 34 and secondary yokes 38 as the main embodiment. The rocking motion within the main plane of wiper blade assembly 24 is provided by allowing secondary yoke 38 to swivel on rocker shaft 92. The tilting motion of secondary yokes 38 is accommodated by flexible bushing 90, which allows pivot shaft 92 to tilt. The tilting motion is limited by the sidewalls of secondary yoke 38 impinging upon inclined sides of plug 94. The inclination of the sides of plug 94 are so adjusted that the resulting tilting angles of secondary yokes 38 and the entire tilting substructure correspond to angles $\alpha$ and $\beta$ shown in FIGS. 3a and 3b, respectively. As the secondary yoke tilts, bushing 90 deforms and thus provides some small resistance to tilting. This contributes to damping of noise as the secondary yoke flips between the opposite tilted positions. This second embodiment of dual-pivot hinge, which has similar advantages as the main embodiment, is especially well suited for windshield wiper blades with main and secondary yokes made of plastic or similar material.

Figures 6, 7:
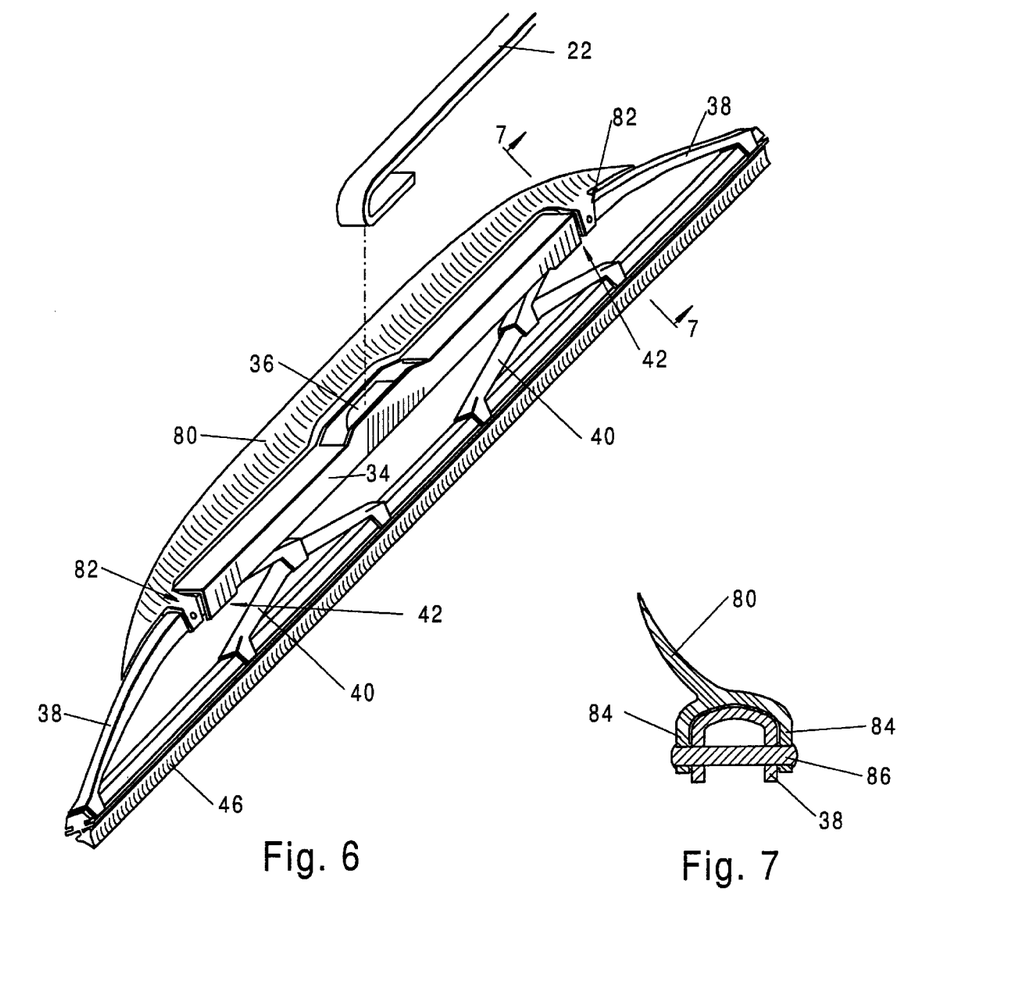
FIG. 6 shows an isometric view of a second embodiment of the airflow deflector.
FIG. 7 shows cross-section of the second embodiment of the airflow deflector and of its attachment hinge.

A second embodiment of airflow deflector is shown FIGS. 6 and 7. In particular, FIG. 6 shows an isometric view of the second embodiment. It is a single, bridge-type airflow deflector 80, positioned above main yoke 34, so that it is generally on the opposite side of hinges 42 than wiping element 46. The cross-section of airflow deflector 80 is formed in an airfoil shape. Moreover, it is slanted with respect to middle plane N of the tilting substructure in a way similar to the dual airflow deflectors 44 shown in FIGS. 2 and 3. Airflow deflector 80 is articulated on secondary yokes 38 by means of airfoil attachment hinges 82. FIG. 7 shows a cross-section of the airfoil attachment hinge. Two hinge brackets 84 extend from airflow deflector 80 and curve around both sides of secondary yoke 38. An airfoil retainer shaft 86 extends through apertures in brackets 84 and in the sidewalls of secondary yoke 38, thus connecting pivotally airflow deflector 80 and secondary yoke 38.

The basic operation of bridge-type airflow deflector 80 is similar to the operation of the main embodiment of airflow deflector 44, as shown in FIGS. 3a and 3b and described above. Briefly, airflow deflector 80 is articulated on and tilts with secondary yokes 38 as windshield wiper blade 24 sweeps across the windshield. When airflow in airflow direction 28 is present, the air pressure creates force F acting on components of the tilting substructure (this is illustrated in FIG. 3 for the main embodiment of this invention). At higher speeds, this force can overcome the friction force and cause flip of the tilting substructure into an undesirable, opposite tilt position, which can cause wiper blade chatter. Airflow deflector 80 generates airflow-induced force P that counteracts this undesirable tilting. This is possible because the airflow deflector is articulated on secondary yokes 38, which are a part of and support the tilting substructure. To best accomplish this objective, the width of airflow deflector 80 need to be properly adjusted according to the specific dimensions of the wiper blade assembly. Typically, the width in the main part of the airflow deflector is between one to two times the total height of wiping element 46, as measured in the direction normal to the windshield. Additionally, airflow deflector 80 contributes to prevention of blade liftoff.

Airfoil attachment hinge 82 serves to accommodate the limited rocking motion of secondary yokes 38 within the plane of windshield wiper assembly 24. This rocking motion is necessary to accommodate various curvatures of windshields. At the same time, hinge 82 forces the airflow deflector to perform the tilting motion in unison with secondary yokes 38 and the entire tilting substructure.

Figure 8:
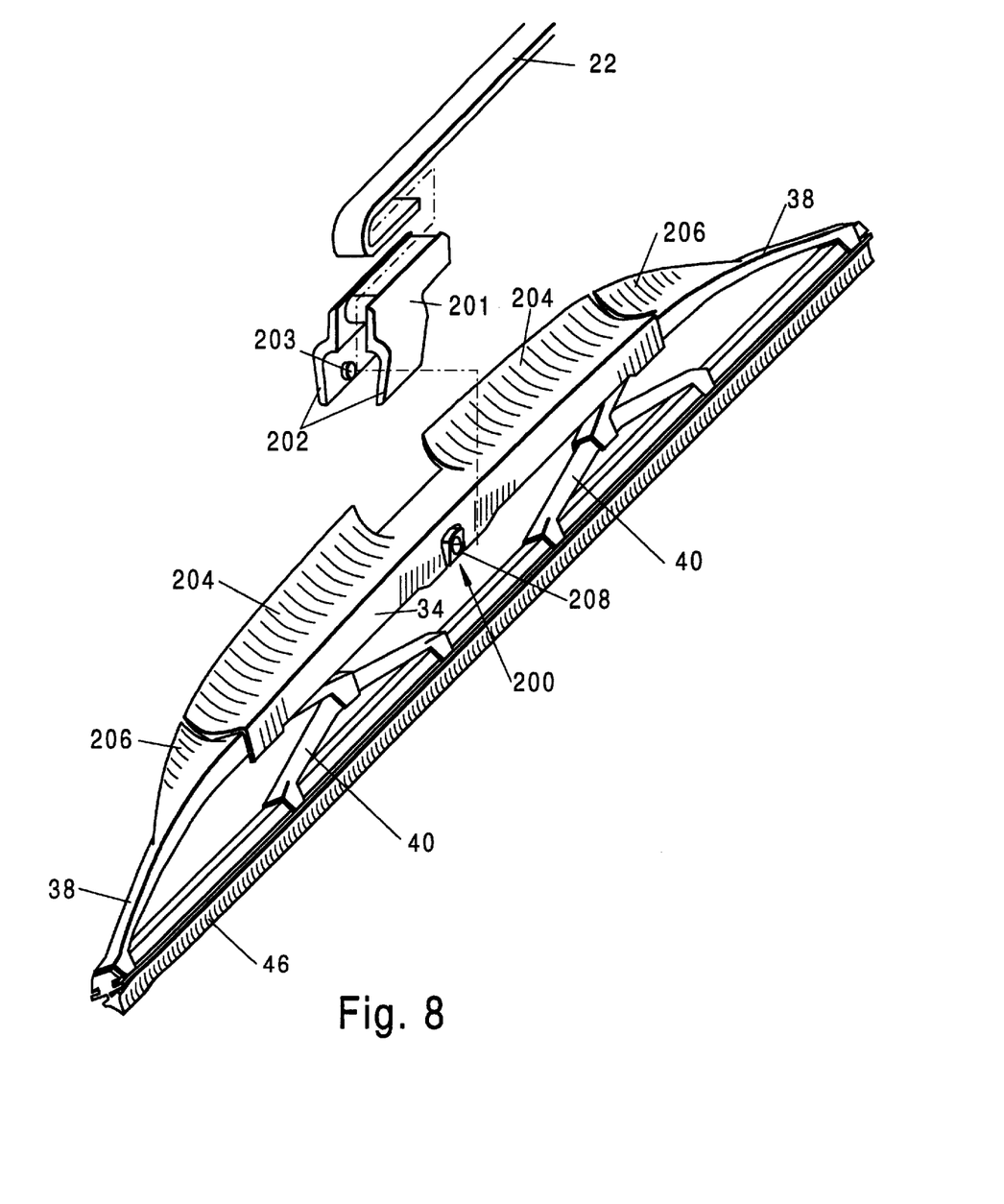
FIG. 8 shows an isometric view of the alternative embodiment of the windshield wiper according to the present invention.

Description of Alternative Embodiment of the Invention— FIGS. 8, 9 and 10

FIGS. 8 and 10 show an alternative embodiment of the wiper blade assembly according to the present invention. In particular, FIG. 8 shows an isometric view of the alternative embodiment, in a version best fitted for wiper blade assemblies made of resilient polymeric material, such as hard plastic. According to this embodiment, windshield wiper arm 22 connects detachably to a wiper blade pivot retainer or connector 201. The pivot retainer has two sidewalls 202 shaped so as to embrace between them the central part of main yoke 34. On the inner side of each sidewall 202 a retainer axle 203 protrudes. The retainer axles fit pivotally into a pivot connector aperture 210 in a longitudinal pivot connector 208, thus attaching the connector pivotally to wiper arm 22. Alternatively, other means of articulating longitudinal pivot connector 208 on wiper arm 22 can be used, such as a shaft extending from the wiper arm through aperture 210. To facilitate tilting of the wiper blade, the longitudinal pivot connector is articulated to the main yoke 34 in a way that forms a longitudinal pivot hinge 200. The longitudinal pivot hinge allows for limited tilting of the main yoke 34 with respect to longitudinal pivot connector 208 and wiper arm 22. The details of hinge 200 will be described later. On both distal ends of main yoke 34 two secondary yokes 38 are articulated. In the typical windshield wiper shown in FIG. 8, tertiary yokes 40 are articulated on the distal ends of secondary yokes 38. The outer ends of secondary yokes 38 and both ends of tertiary yokes 40 support wiping element 46. In general, more than two tertiary yokes may be present or none at all.

Figure 9A:
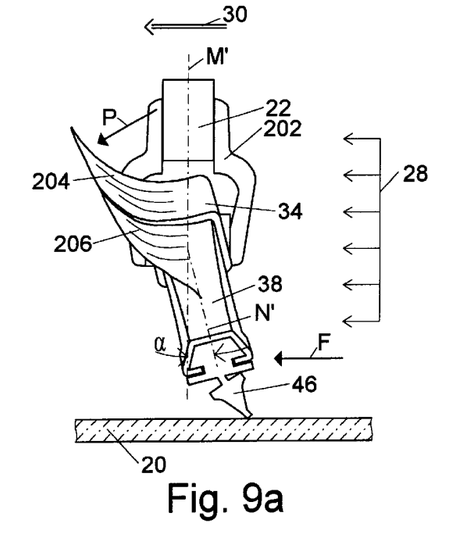
FIGS. 9a and 9b show side views of the alternative embodiment and illustrate its mode of operation.
Figure 9B:
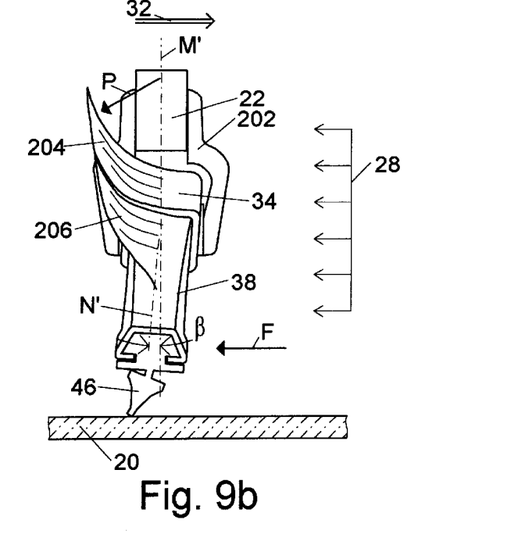

On the dorsal portion of main yoke 34, two main yoke airflow deflectors 204 are protruding. The deflectors are separated sufficiently to provide opening for pivot retainer 201 in the central part of the main yoke. Main yoke airflow deflectors are augmented by two secondary yoke airflow deflectors 206, which protrude from dorsal parts of secondary yokes 38 and form a rather continuous extension of the shape of main yoke airflow deflectors 204. Airflow deflectors 204 and 206 are located generally on the opposite side of longitudinal pivot hinge 200 than wiping element 46. They are shaped in an airfoil-like form and slanted towards the leeward side of wiper blade assembly 24, as shown in FIGS. 8, 9a and 9b. In the presented embodiment, airflow deflectors 204 and 206 are integral with main yoke 34 and secondary yokes 38, respectively. In an alternative variation of this embodiment, the airflow deflectors can be formed as a separate parts and attached to the main and secondary yokes by appropriate attachment means. Main yoke 34, secondary yokes 38, tertiary yokes 40, wiping element 46, airflow deflectors 204, 206 and relevant attachments constitute a tilting substructure of the wiper blade, with a middle plane N'. Wiper blade pivot retainer 201 and longitudinal pivot connector 208 constitute a non-tilting substructure of the wiper blade, with a main plane of the non-tilting substructure denoted M'.

The operation of the alternative embodiment of the present invention is shown in FIGS. 1 and 9. It is based on the same principles as the operation of the main embodiment. As wiper arm 22 shown in FIG. 1 reciprocates in sweep directions 30 and 32, wiper blade 24 is drawn across the windshield. The friction force between windshield 20 and wiping element 46 causes wiper blade assembly 24 to tilt accordingly to the direction of sweep.

FIG. 9a shows a side sectional view of wiper blade assembly 24 as it is drawn across windshield 20 in the downwind sweep direction 30. Middle plane N' of the tilting substructure is tilted off the main plane M' of the non-tilting substructure by a tilt angle $\alpha$. The recommended limiting value of the tilt angle $\alpha$ is in the range of 10 to 20 degrees. This tilted position corresponds to positive angle of attack and causes resistance to chatter and squeak during the sweeping motion.

When the airflow in airflow direction 28 is present, the air pressure creates force F acting on the components of wiper blade 24, including wiping element 46, tertiary yokes 40 and secondary yokes 38. This force tends to flip the wiper blade into an undesirable, opposite tilt position, which can cause wiper blade chatter. To counteract this, similarly as in the main embodiment, the airflow pressure on airflow deflectors 204 and 206 creates an aerodynamic force P that balances off the undesirable tilting moment caused by force F. To best accomplish this objective, the width of airflow deflectors 204 and 206 need to be properly adjusted according to the specific dimensions of the wiper blade assembly. Typically, the width of the major portion of the airflow deflectors is between one to two times the total height of wiping element 46, as measured in the direction normal to the windshield. Additionally, since the aerodynamic force P is directed towards the windshield 20, the airflow deflectors contribute to prevention of blade liftoff.

FIG. 9b shows a side view of wiper blade assembly 24 as it is drawn across windshield 20 in the upwind sweep direction 32. The tilt angle of the tilting substructure is $\beta$. The angle $\beta$ is essentially smaller than the angle $\alpha$—the preferred maximum value of the tilt angle $\beta$ is in the range of 0 to 5 degrees. This is for the same reasons as given for the main embodiment of this invention.

Figure 10A:
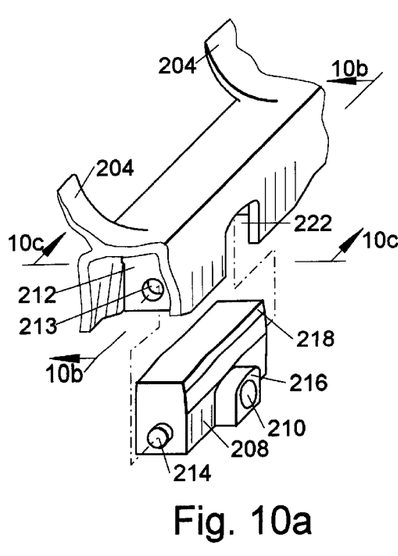
FIGS. 10a, 10b and 10c show the details of the longitudinal pivot hinge according to the alternative embodiment of the present invention.
Figure 10B:
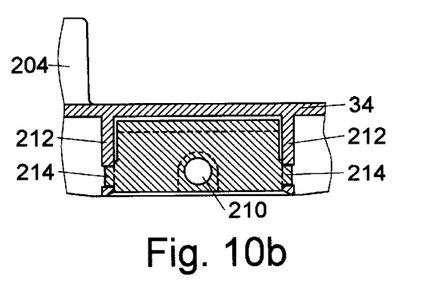
Figure 10C:
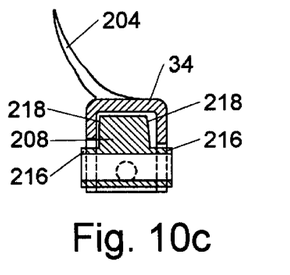

FIGS. 10a, 10b and 10c show a basic embodiment of longitudinal pivot hinge 200. FIG. 10a shows an exploded view of the longitudinal hinge assembly. FIG. 10b shows a sectional view of the hinge corresponding to section lines 10b—10b in FIG. 10a. FIG. 10c shows a sectional view corresponding to section lines 10c—10c in FIG. 10a. As it was shown in FIG. 8 and discussed above, longitudinal pivot connector 208 is attached to wiper arm 22 by means of wiper blade pivot retainer 201.

Longitudinal pivot connector 208 fits into a cavity between sidewalls of main yoke 34 and between two resilient flaps 212. The resilient flaps protrude downward from the dorsal wall of main yoke 34. Two longitudinal pivot axles 214 extend from end portions of connector 208 and engage flap apertures 213 in flaps 212, thus tiltably securing the connector in place. In the top part of connector 208, a bumper ridge or bevel 218 is formed on each side. On both sides of the longitudinal pivot connector, pivot connector flanges 216 extend around the ends of aperture 210. The sidewalls of main yoke 34 are provided with rounded sidewall notches 222 to accommodate flanges 216. Sufficient clearance is provided in notches 222 to prevent contact between flanges 216 and sidewalls of main yoke 34 at all tilted positions of longitudinal pivot connector 208.

The longitudinal pivot hinge 200 allows for limited relative pivot between main yoke 34 and longitudinal pivot connector 208. The longitudinal pivot axis is generally parallel to the main yoke. In particular, it is defined by axles 214 and apertures 213 in resilient flaps 212. The tilting motion is limited by bumper ridges 218 impinging onto the sidewalls of main yoke 34. The gaps between each bumper ridge and the sidewalls of the main yoke are adjusted to effectuate tilting angles $\alpha$ and $\beta$ shown in FIGS. 9a and 9b, respectively. This limited pivot action results in tilting of wiper blade assembly 24 as it sweeps the windshield, as shown in FIGS. 9a and 9b. The friction between resilient flaps 212 and connector 208 contributes to damping of vibration and noise as the wiper blade flips from one tilted position to another.

The present longitudinal pivot hinge provides an important improvement over the previous art shown in U.S. Pat. No. 2,160,736 to Horton (1939), U.S. Pat. No. 3,751,754 to Quinlan (1973), U.S. Pat. No. 4,169,298 to Smith (1979) or U.S. Pat. No. 5,437,077 to O'Donnell (1995). This is achieved by locating the longitudinal pivot axis (defined by axles 214 ) between the dorsal part of main yoke 34 and wiping element 46, as opposed to longitudinal pivot hinges located above the dorsal part of main yoke, shown in the previous art. This improvement creates a more inconspicuous hinge and produces greater distance between said longitudinal pivot axis and the aerodynamic center of airflow deflectors 204 and 206. This greater distance increases the desirable balancing moment created by aerodynamic force P shown in FIGS. 9a and 9b.

CONCLUSIONS, RAMIFICATIONS AND SCOPE OF INVENTION

Thus the reader can see that the windshield wiper blade of the invention provides superior chatter- and squeak-resistant operation at a wide range of driving speeds, with added resistance to wind lift. This is accomplished with simple construction and operation of windshield wiper, without special drivers or complex control devices. Thus, the present invention successfully solves the problems of chatter, squeak and wind lift, which adversely affected previous art solutions.

While my above description contains many specificities, these should not be construed as limitations on the scope the invention, but rather as an exemplification of selected preferred embodiments thereof. Many other variations are possible. Indeed, a person with basic skills in relevant arts could come out with multitude of materials, connectors, hinges, adhesives, claws, shafts, etc. that could replace or modify the components described herein, while maintaining the basic principles and effective operation of this invention. For example:

The components of windshield wiper assembly may be constructed from various materials including, but not limited to, metals, plastics, composites, etc.

The present invention may be applied to windshield wipers of various sweep patterns, not limited to the sample ones shown in FIG. 1.

The airflow deflectors may be constructed as separate components articulated to main or secondary yokes, or may be extruded or otherwise formed as integral parts of these components.

The hinges and connectors disclosed in this invention may be replaced with virtually infinite variety of hinges and connectors that provide equivalent attachment and range of motion.

Pivot shafts may be replaced by bolts, protruding axles or other solutions that allow for relevant rotations.

Airflow deflectors introduced in this invention can be used in combination with other airflow deflecting devices, or partially omitted without compromising their overall functionality.

The hinges that allow for tilting about the longitudinal axis of the wiper blade may be introduced at different locations than the sample embodiments disclosed herein. For example, they may be introduced within the length span of the primary yoke, rather that at the connection between primary and secondary yokes.

The dimensions of airflow deflectors and the tilt angles $\alpha$ and $\beta$ may be different than the preferred values indicated in this disclosure.

Windshield wiper assemblies may be equipped with more than two tertiary yokes or only use main and secondary yokes, or use other equivalent system of supporting the wiping element.

Accordingly, the scope of the invention should be determined not by the embodiments illustrated, but by the appended claims and their legal equivalents.

I claim:

1. In a windshield wiper which includes a wiping element pressed to and moved across a windshield, said wiping element being supported by a supporting structure, said supporting structure including two secondary yokes and a main yoke, said main yoke being elongated and having two distal ends, said secondary yokes articulated to said distal ends of said main yoke, said main yoke being, in turn, articulated to a wiper arm, said wiping element and said supporting structure constituting a wiper blade assembly, said wiper blade assembly being elongated and defining a longitudinal middle plane, said longitudinal middle plane generally bisecting said wiper blade assembly, said wiper blade assembly being potentially exposed to an airflow, wherein the improvement comprises:

a) hinge means for pivotally connecting said secondary yokes to said distal ends of said main yoke, so as to allow for a tilting of each of said secondary yokes relative to said main yoke, said hinge means being elongated and defining a main plane which generally bisects said main yoke and an end portion of said wiper arm, the angular displacements of said tilting being limited to a predetermined value of said middle plane to each side of said main plane, b) at least one airflow deflector, said at least one airflow deflector being positioned generally above said secondary yokes and extending upwardly therefrom, c) attachment means for attaching said airflow deflectors to said secondary yokes, so as to effectuate tilting of said airflow deflectors in unison with said tilting of said secondary yokes, whereby said secondary yokes and the wiping element supported thereby tilt to a chatter-resistant position as said wiping element sweeps the windshield, and the tilting moment created by the aerodynamic force acting on said airflow deflectors balances off the moment created by the airflow force acting on said wiping element, thus preventing said secondary yokes and the substructure supported thereby from being flipped to an undesirable chatter-prone position by said airflow.

2. The windshield wiper of claim 1, wherein said hinge means for pivotally connecting said secondary yokes to said main yoke allow tilting to one side of said main plane to a greater extent than to the other side.

3. The windshield wiper of claim 1, wherein the number of said airflow deflectors equals two, and wherein, for each of said airflow deflectors, said attachment means attach said airflow deflector to said secondary yoke, said airflow deflector extending longitudinally in a direction generally parallel to said wiper blade assembly, said airflow deflector being oriented to said airflow so as to exert an aerodynamic force in a direction which is approximately transverse relative to said wiper blade assembly and is inclined towards said windshield.

4. The windshield wiper of claim 3, wherein said attachment means for attaching said airflow deflectors to said secondary yokes are realized as said airflow deflector being integral with said secondary yokes.

5. The windshield wiper of claim 1, wherein one of said airflow deflectors is articulated, by said attachment means, to said secondary yokes at widely spaced points, so as to extend longitudinally in a direction essentially parallel to said main yoke, said airflow deflector being oriented to said airflow so as to exert an aerodynamic force in a direction which is approximately transverse relative to said wiper blade assembly and is inclined towards said windshield, said airflow deflector being sufficiently spaced from said main yoke so as to make possible relative motion between said airflow deflector and said main yoke during said tilting of said secondary yokes.

6. The windshield wiper of claim 5, wherein each of said attachment means comprises:

a) two brackets protruding from said airflow deflector and extending around the sides of said secondary yoke, b) an aperture in each of said brackets, c) one or more coaxial apertures in said secondary yoke, d) a shaft extending through said apertures in said brackets and through said apertures in said secondary yoke.

7. The windshield wiper of claim 1, wherein said hinge means for pivotally connecting said secondary yoke to said distal end of said main yoke includes:

a) a resilient element having a dorsal wall and two sidewalls, said sidewalls extending essentially perpendicular to said dorsal wall, said sidewalls having distal edges located on the opposite side of said sidewalls than said dorsal wall, said resilient element being made from resilient material so as to allow flexing of said sidewalls, said sidewalls furthermore including cut-out notches in said distal edges, said dorsal wall having a fulcrum ridge on the underside of said dorsal wall, said fulcrum ridge extending transversely with respect to said dorsal wall, b) a section of said secondary yoke, said section having a dorsal part and two sidewalls, said sidewalls having bottom edges located on the side of said sidewalls opposite to said dorsal part, said dorsal part resting against said fulcrum ridge so as to allow rocking of said secondary yoke on said fulcrum ridge, said section of said secondary yoke fitting between said sidewalls of said resilient element, said sidewalls of said secondary yoke furthermore including cut-out notches in said bottom edges, c) said distal end of said main yoke, said distal end having a dorsal part and two sidewalls, said sidewalls being provided with two claws extending from said sidewalls, said claws being curved inwardly and engaging said notches in said sidewalls of said resilient element and said notches in said sidewalls of said secondary yoke, said sidewalls of said main yoke being inclined outwardly at predetermined angles so as to allow limited outward flexing of said sidewalls of said resilient element, whereby a connection with limited in-plane rocking and limited out-of-plane tilting is effected of said secondary yoke relative to said main yoke, said tilting having a predetermined angle to each side of said main yoke.

8. The windshield wiper of claim 1, wherein said hinge means for pivotally connecting said secondary yoke to said distal end of said main yoke comprise:

a) a plug protruding from said distal end of said main yoke, in the general direction of said secondary yoke, said plug having sidewalls beveled at predetermined angles, said plug being provided with an aperture extending therethrough in the direction transverse to said main plane of said windshield wiper assembly, b) a bushing made of flexible material, said bushing being disposed inside said aperture in said plug, said bushing being provided with an aperture extending therethrough and being approximately coaxial with said aperture in said plug, c) two sidewalls of said secondary yoke, said sidewalls being spaced relative to each other at a distance large enough to embrace said plug therebetween with a predetermined spacing, said sidewalls being provided with apertures, d) a shaft extending through said apertures in said sidewalls and said aperture in said bushing, whereby a connection with limited in-plane rocking and limited out-of-plane tilting is effected of said secondary yoke relative to said main yoke, the extent of said tilting being limited by a way of inner sides of said sidewalls of said secondary yoke impinging upon said sidewalls of said plug.

9. In a windshield wiper which includes a wiping element pressed to and moved across a windshield, said wiping element being held in a supporting structure which is, in turn, articulated to a wiper arm said wiping element and said supporting structure constituting a wiper blade assembly, said wiper blade assembly being elongated and defining a longitudinal middle plane, said longitudinal middle plane generally bisecting said wiper blade assembly, said wiper blade assembly being potentially exposed to an airflow, wherein the improvement comprises:

a) hinge means for pivotally connecting said supporting structure to said wiper arm, so as to allow for a tilting of said wiper blade assembly relative to said wiper arm, said hinge means being elongated and defining a main plane which generally bisects a part of said hinge means and an end portion of said wiper arm, the angular displacement of said tilting being limited to a predetermined value of said middle plane to each side of said main plane, b) at least one airflow deflector, said at least one airflow deflector being positioned generally above said wiper blade assembly and extending upwardly therefrom, c) attachment means for attaching said airflow deflectors to said supporting structure, so as to effectuate tilting of said airflow deflectors in unison with said tilting of said supporting structure, whereby said wiper blade assembly tilts to a chatter-resistant position as said wiping element sweeps said windshield, and the tilting moment created by the aerodynamic force acting on said airflow deflectors balances off the moment created by the airflow force acting on said wiping element, thus preventing said wiper blade assembly from being flipped to an undesirable chatter-prone position by said airflow.

10. The windshield wiper of claim 9, wherein said hinge means for pivotally connecting said supporting structure to said wiper arm allow tilting to one side of said main plane to a greater extent than to the other side.

11. The windshield wiper of claim 9, wherein said supporting structure includes at least a main yoke and two secondary yokes, and said attachment means attach each of said airflow deflectors to said main yoke or to said secondary yokes, said airflow deflectors extending longitudinally relative to said main yoke and to said secondary yokes, said airflow deflectors being oriented to said airflow so as to exert an aerodynamic force in a direction which is approximately transverse relative to said wiper blade assembly and inclined towards said windshield.

12. The windshield wiper of claim 11, wherein said attachment means are realized by said airflow deflectors being integral with said main yoke and with said secondary yokes, respectively.

13. The windshield wiper of claim 11, wherein said main yoke has, in a central section, a dorsal wall and two sidewalls extending downward from said dorsal wall, said sidewalls being generally perpendicular to said dorsal wall, and wherein said hinge means comprises:

a) a longitudinal pivot connector, said pivot connector being elongated and having two ends, a length and a cross-section, said cross-section being of generally trapezoidal shape with predetermined dimensions so that said connector fits between said sidewalls of said main yoke, wherein predetermined spacing is provided between said longitudinal pivot connector and said sidewalls, b) two axles protruding from said ends of said longitudinal pivot connector, c) two flaps protruding from said dorsal wall of said main yoke in a direction essentially perpendicular to said dorsal wall, said flaps being spaced at a distance approximately equal to said length of said longitudinal pivot connector, each of said flaps having an aperture, said aperture rotatably engaging said axles, d) said part which includes a wiper blade pivot retainer detachably articulated to said wiper arm, said pivot retainer having two essentially parallel sidewalls spaced from each other, each of said sidewalls having a protruding axle on an inner side of said sidewall, e) two apertures in said longitudinal pivot connector, said apertures rotatably engaging said axles protruding from said sidewalls, whereby a tilting is effected of said main yoke relative to said longitudinal pivot connector and to said wiper arm, said tilting being limited to a predetermined angle by said longitudinal pivot connector impinging upon said sidewalls of said main yoke.

14. The windshield wiper of claim 11, wherein said main yoke has, in a central section, a dorsal wall and two sidewalls extending downward from said dorsal wall, said sidewalls being generally perpendicular to said dorsal wall, and wherein said hinge means comprise:

a) a longitudinal pivot connector, said pivot connector being elongated and having two ends, a length and a cross-section, said cross-section being of generally trapezoidal shape with predetermined dimensions so that said connector fits between said sidewalls of said main yoke, wherein predetermined spacing is provided between said longitudinal pivot connector and said sidewalls, b) two axles protruding from said ends of said longitudinal pivot connector, c) two flaps protruding from said dorsal wall of said main yoke in a direction essentially perpendicular to said dorsal wall, said flaps being spaced at a distance approximately equal to said length of said longitudinal pivot connector, each of said flaps having an aperture, said aperture rotatably engaging said axles, d) a pivot shaft extending from said wiper arm in a direction essentially perpendicular to said main plane of said wiper blade assembly and essentially parallel to said windshield, e) an aperture in said longitudinal pivot connector, said aperture rotatably engaging said pivot shaft, f) means for locking and releasing said pivot shaft in an engaged position inside said aperture, whereby a tilting is effected of said main yoke relative to said longitudinal pivot connector and to said wiper arm, said tilting being limited to a predetermined angle by said longitudinal pivot connector impinging upon said sidewalls of said main yoke.

15. In a wiping device which includes a wiping element pressed to and moved across a surface, said wiping element being supported by a supporting structure, said supporting structure being articulated to a wiper arm, said wiping element and said supporting structure constituting a wiper blade assembly, said wiper blade assembly being elongated and defining a longitudinal middle plane, said longitudinal middle plane generally bisecting said wiper blade assembly, said wiper blade assembly being potentially exposed to an airflow, wherein the improvement comprises:

a) said supporting structure being divided into two substructures, a tilting substructure and a non-tilting substructure, said tilting substructure supporting said wiping element, b) hinge means for pivotally connecting said tilting substructure to said non-tilting substructure, so as to allow for a tilting of said tilting substructure relative to said non-tilting substructure, said hinge means being elongated and defining a main plane which generally bisects said non-tilting substructure and an end portion of said wiper arm, the angular displacement of said tilting being limited to a predetermined value of said middle plane to said main plane, c) at least one airflow deflector, said at least one airflow deflector being positioned generally above said tilting substructure and extending upwardly therefrom, d) attachment means for attaching said airflow deflectors to said tilting substructure, so as to effectuate tilting of said airflow deflectors in unison with said tilting of said tilting substructure, whereby said tilting substructure tilts to a chatter-resistant position as said wiping element sweeps said surface, and the tilting moment created by aerodynamic force acting on said airflow deflectors balances off the moment created by the airflow force acting on said wiping element and said tilting substructure, thus preventing said tilting substructure from being flipped to an undesirable chatter-prone position by said airflow.

* * * * *

UNITED STATES PATENT AND TRADEMARK OFFICE
CERTIFICATE OF CORRECTION

PATENT NO : 5,946,764
DATED : 09/07/99
INVENTOR(S) : Wlodzimierz Woytek Tworzydlo It is certified that error appears in the above-identified patent and that said Letters Patent is hereby corrected as shown below:

On the title page, item [54], and column 1, line 1:

change 'TILIABLE' to 'TILTABLE'

Item [76]: Inventor information, change 'Springwagon' to 'Spring Wagon'

Col. 2, line 61, after 'present' insert ' invention.'

Col. 12, line 61, after 'arm' insert a comma: ','

Signed and Sealed this

Eighteenth Day of April, 2000

*Attest:*

Q. TODD DICKINSON

*Attesting Officer*      *Director of Patents and Trademarks*